(12) United States Patent
Koshiro

(10) Patent No.: US 9,482,405 B2
(45) Date of Patent: Nov. 1, 2016

(54) VEHICLE LIGHTING DEVICE

(71) Applicant: ICHIKOH INDUSTRIES, LTD., Isehara-shi, Kanagawa-ken (JP)

(72) Inventor: Hiroshi Koshiro, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 29 days.

(21) Appl. No.: 14/681,582

(22) Filed: Apr. 8, 2015

(65) Prior Publication Data
US 2015/0292704 A1 Oct. 15, 2015

(30) Foreign Application Priority Data
Apr. 9, 2014 (JP) ................. 2014-080503

(51) Int. Cl.
*F21S 8/10* (2006.01)
*B60Q 1/00* (2006.01)

(52) U.S. Cl.
CPC ......... *F21S 48/2237* (2013.01); *B60Q 1/0041* (2013.01); *B60Q 1/0058* (2013.01); *F21S 48/215* (2013.01); *F21S 48/2268* (2013.01); *F21S 48/2287* (2013.01); *F21S 48/236* (2013.01); *F21S 48/24* (2013.01); *B60Q 2400/30* (2013.01)

(58) Field of Classification Search
CPC .............. B60Q 1/0041; B60Q 1/0058; B60Q 2400/30; F21S 48/24; F21S 48/215; F21S 48/236; F21S 48/2237; F21S 48/2268; F21S 48/2287
See application file for complete search history.

(56) References Cited

U.S. PATENT DOCUMENTS

| 2010/0053987 A1* | 3/2010 | Nakabayashi | F21S 48/1154 362/538 |
|---|---|---|---|
| 2012/0069592 A1* | 3/2012 | Natsume | B60Q 1/0052 362/511 |

FOREIGN PATENT DOCUMENTS

| JP | 2008-147032 A | 6/2008 |
|---|---|---|
| JP | 2014-029775 A | 2/2014 |

* cited by examiner

*Primary Examiner* — Stephen F Husar
(74) *Attorney, Agent, or Firm* — Foley & Lardner LLP

(57) ABSTRACT

A present invention includes a lamp housing, a lamp lens, a first lamp unit, and a second lamp unit. The first lamp unit includes a semiconductor-type light source, and a light guide member. The light guide member has an exit surface, and a reflection surface. A plane exit surface is provided in a part of the exit surface for blocking a part of a radiated light L4 from the second lamp unit, and a plane incident surface is provided in a part of the reflection surface for blocking a part of the radiated light L4 from the second lamp unit. As a result, the present invention is able to minimize an optical loss of the radiated light L4, even when the light guide member is located at a position for blocking a part of the radiated light L4 from the second lamp unit.

5 Claims, 6 Drawing Sheets

VEHICLE LIGHTING DEVICE

CROSS-REFERENCE TO RELATED APPLICATIONS

This application claims priority of Japanese Patent Application No. 2014-080503 filed on Apr. 9, 2014. The contents of this application are incorporated herein by reference in their entirety.

BACKGROUND OF THE INVENTION

1. Field of the Invention

The present invention relates to a vehicle lighting device comprising a light guide member.

2. Description of the Related Art

A vehicle lighting device comprising with a light guide member has been known before (e.g., JP-A-2014-29775). The conventional vehicle lighting device of the JP-A-2014-29775 will be explained below. The conventional vehicle lighting device comprises a headlamp unit (HL unit), and a daytime running lamp unit (DRL unit). The HL unit comprises a light source, and a light guide lens. The light guide lens has an incident surface, and a front reflection surface, a rear reflection surface, an exit surface, and a translucent portion.

The conventional vehicle lighting device is configured such that light from the light source enters the light guide lens from the incident surface, the incident light reflects on the front reflection surface, reflects on the rear reflection surface, and exits forward from the exit surface. Light from the DRL unit passes through the translucent portion of the light guide lens, and exits forward.

In the above conventional vehicle lighting device, an optical loss may occur light when the light from the DRL unit passes through the translucent portion of the light guide lens. It is important to minimize the optical loss.

SUMMARY OF THE INVENTION

An object of the present invention is to minimize an optical loss.

A vehicle lighting device according to first aspect of the present invention comprising: a lamp housing and a lamp lens that partition a lamp chamber; and a first lamp unit and a second lamp unit that are arranged in the lamp chamber, wherein the first lamp unit comprises a light source, and a light guide member, and the light guide member forms a rod shape for guiding light by utilizing total reflection inside, comprises an incident surface to incident light from the light source, an exit surface to emit incident light, and a reflection surface to reflect incident light to the exit surface, the light guide member is located in front of a light radiating direction of the second lamp unit, and a plane is provided at a position for blocking a part of radiated light from the second lamp unit.

The vehicle lighting device according to second aspect of the present invention, wherein the plane is provided in at least one of a part for blocking a part of the radiated light of the exit surface of the light guide member, and a part for blocking a part of the radiated light of the reflection surface of the light guide member.

The vehicle lighting device according to third aspect of the present invention, wherein the exit surface comprises an arcuate surface having a substantially arcuate cross section vertical or substantially vertical to a light guide direction of the light guide member, the the reflection surface comprises a plane having a substantially linear cross section vertical or substantially vertical to a light guide direction of the light guide member, a step surface is provided between the reflection surface and the reflection surface, a prism is comprised of the reflection surface and the step surface, and a plane exit surface for emitting the radiated light is provided in at least a part of the arcuate exit surface for blocking a part of the radiated light, or a plane incident surface to incident the radiated light is provided in at least a part of the prism for blocking a part of the radiated light.

The vehicle lighting device according to fourth aspect of the present invention, wherein the plane incident surface is provided at least between the part of the prism for blocking a part of the radiated light and the prism.

The vehicle lighting device according to fifth aspect of the present invention, wherein a plane part is provided between the prism from a part of the incident surface to a part for blocking a part of the radiated light and the prism, and the plane increases as separating from the incident surface.

According to the above aspect of the vehicle lighting device of the invention, a plane is provided in at least one of a part of the exit surface for blocking a part of radiated light and a part of the reflection surface for blocking a part of radiated light. As a result, even when a light guide member of a first lamp unit is disposed in a position for blocking a part of radiated light from a second lamp unit, the radiated light from the second lamp unit passes through the plane of the reflection surface or the plane of the exit surface of the light guide member, and an optical loss of the radiated light can be minimized.

DESCRIPTION OF THE PREFERRED EMBODIMENTS

Hereinafter, an exemplary embodiment of a vehicle lighting device according to the present invention will be specifically described with reference to the accompanying drawings. The present invention is not limited to the embodiment. In the specification, front, back, top, bottom, left, right indicate front, back, top, bottom, left, right when the vehicle lighting device according to the invention is equipped in a vehicle.

Figure 1:
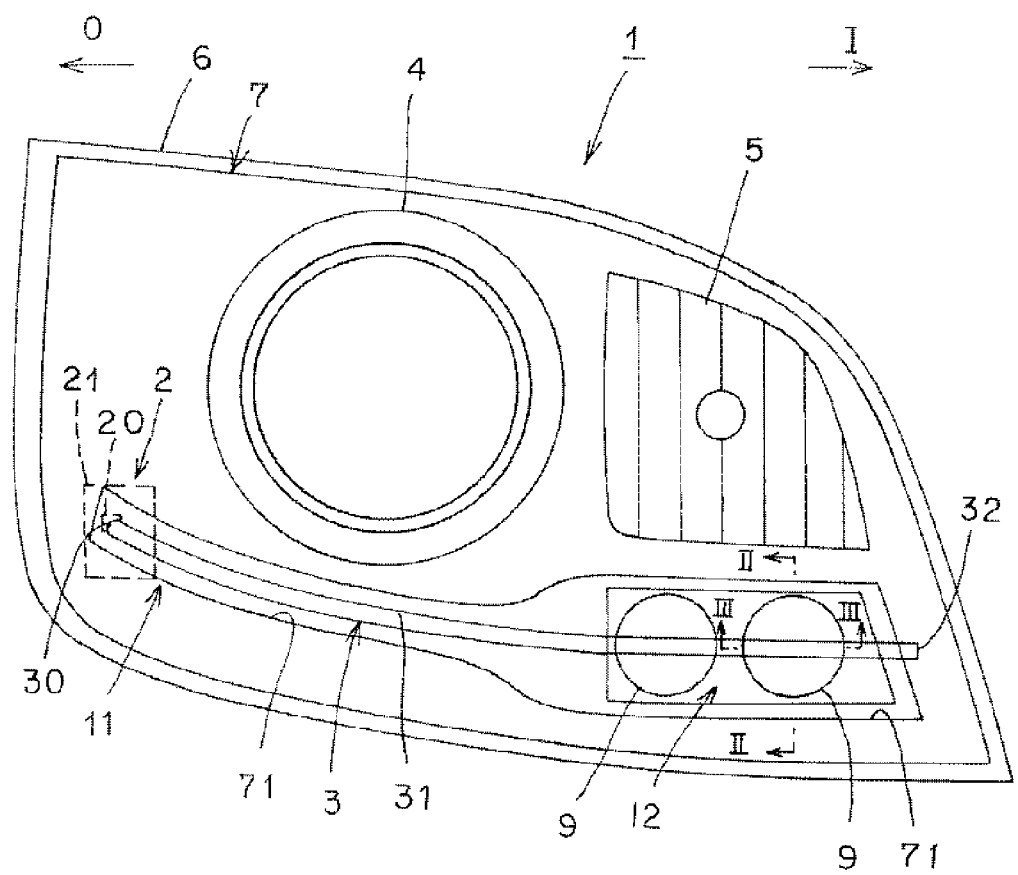
FIG. 1 is a front view of an embodiment of the vehicle lighting device according to the invention.
Figure 2:
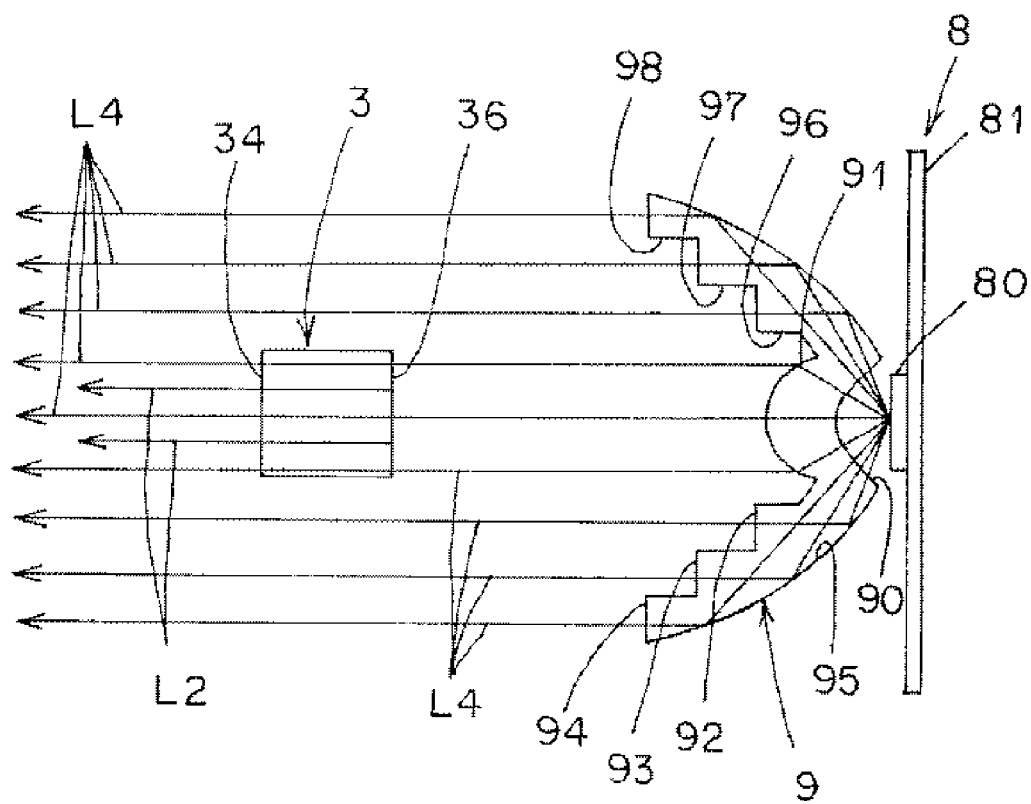
FIG. 2 is a longitudinal sectional view (sectional view taken along line II-II in FIG. 1) showing a light guide member of a first lamp unit, and a second lamp unit.
Figure 3:
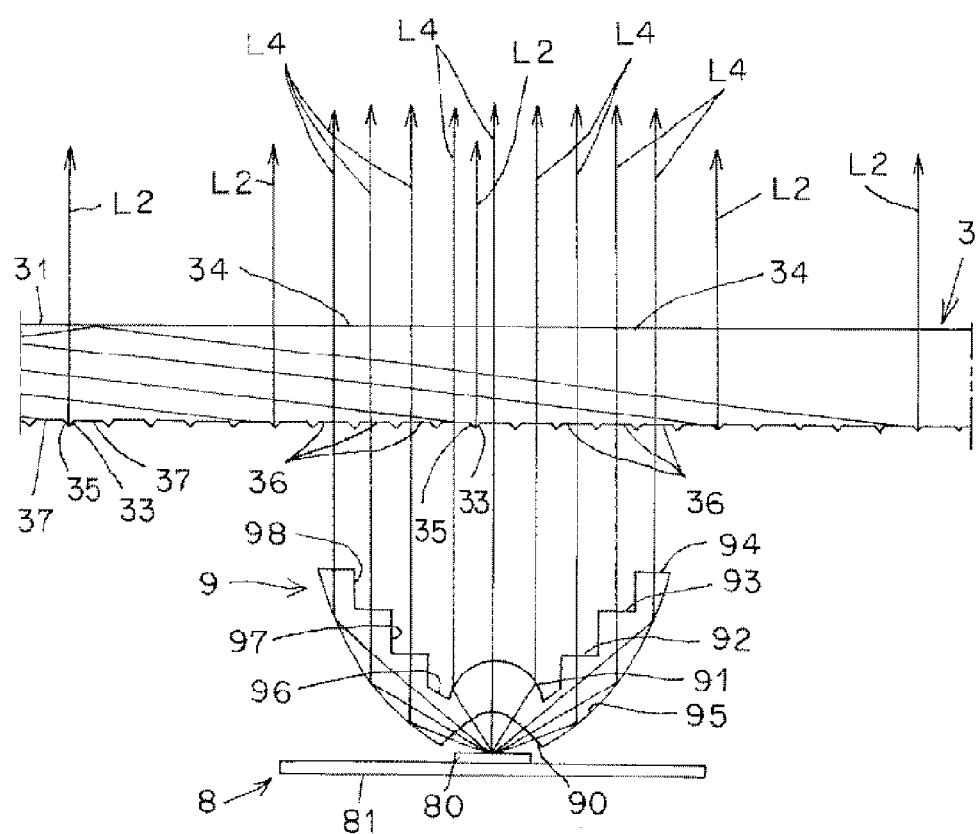
FIG. 3 is a cross sectional view (sectional view taken along line III-III in FIG. 1) showing a light guide member of a first lamp unit, and a second lamp unit.

In FIG. 1, a symbol "I" indicates the inside of a vehicle, and a symbol "O" indicates the outside of a vehicle. In FIGS. 2 to 7, hatching of a light guide member is omitted. In FIGS. 2 and 3, hatching of a lens member is omitted. Light is indicated by a solid line arrow in the figures.

(Description of Configuration of the Embodiment)

FIGS. 1 to 8 (A) show embodiments of the vehicle lighting device according to the invention. Hereinafter, the configuration of the vehicle lighting device according to the embodiments will be described. In FIG. 1, a reference numeral "1" designates a vehicle lighting device according to the embodiment. The vehicle lighting device 1 is, for example, a clearance lamp and a daytime running lamp of a front combination lamp, such as a vehicle headlight or headlamp.

The vehicle lighting device 1 is mounted on the right and left sides of the front of a vehicle (not shown). A design surface in the front of the vehicle is inclined toward the front of the vehicle (toward from the rear side to the front side of the vehicle), in the vertical direction (from the upper side to the lower side of the vehicle), and in the horizontal direction (from the outside O to inside I of the vehicle).

In the vehicle lighting device 1 mounted on the right side, the outside O of the vehicle is right, and the inside I of the vehicle is left. On the other hand, in the vehicle lighting device mounted on the left side, the outside O of the vehicle is left, and the inside I of the vehicle is right.

Hereinafter, a description will be given with respect to the right-side vehicle lighting device 1 that is mounted on the right side of the vehicle. In the left-side vehicle lighting device that is mounted on the left side of the vehicle, the left and right are reverse to those of the right-side vehicle lighting device 1, and the other configuration is substantially the same, and the description thereof will be omitted.

(Description of Vehicle Lighting Device 1)

The vehicle lighting device 1 is, as shown in FIG. 1, comprised of a first lamp unit 11 as a clearance lamp, a second lamp unit 12 as a daytime running lamp, a low beam headlamp 4 and a high beam headlamp 5 as other lamp units, a lamp housing (not shown), a lamp lens 6 (for example, a plain outer cover, and an outer lens), and an inner panel (inner housing) 7.

The first lamp unit 11, the second lamp unit 12, the low beam headlamp 4, the high beam head lamp 5, and the inner panel 7 are disposed in a lamp chamber that is partitioned by the lamp housing and the lamp lens 6.

The lamp chamber may include other lamp units (not shown), such as a fog lamp, a cornering lamp, and a turn signal lamp, in addition to the first lamp unit 11, the second lamp unit 12, the low beam headlamp 4, and the high beam head lamp 5.

(Description of First Lamp Unit 11)

The first lamp unit 11 comprises a semiconductor-type light source 2 as a light source, and a light guide member 3. The semiconductor-type light source 2 and light guide member 3 are partially hidden by the inner panel 7 when viewed from the lamp lens 6. The most part of the light guide member 3, the low beam headlamp 4, the high beam headlamp 5, and the inner panel 7 can be viewed through the lamp lens 6 as shown in FIG. 1

(Description of Semiconductor-type Light source 2)

Figure 5:
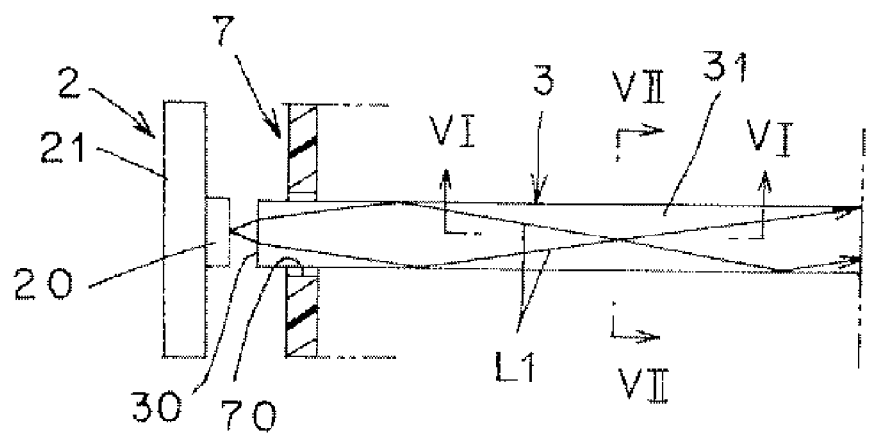
FIG. 5 is a sectional view showing a part of an inner panel, a light source of a first lamp unit, and a part of an incident surface of a light guide member.
Figure 6:
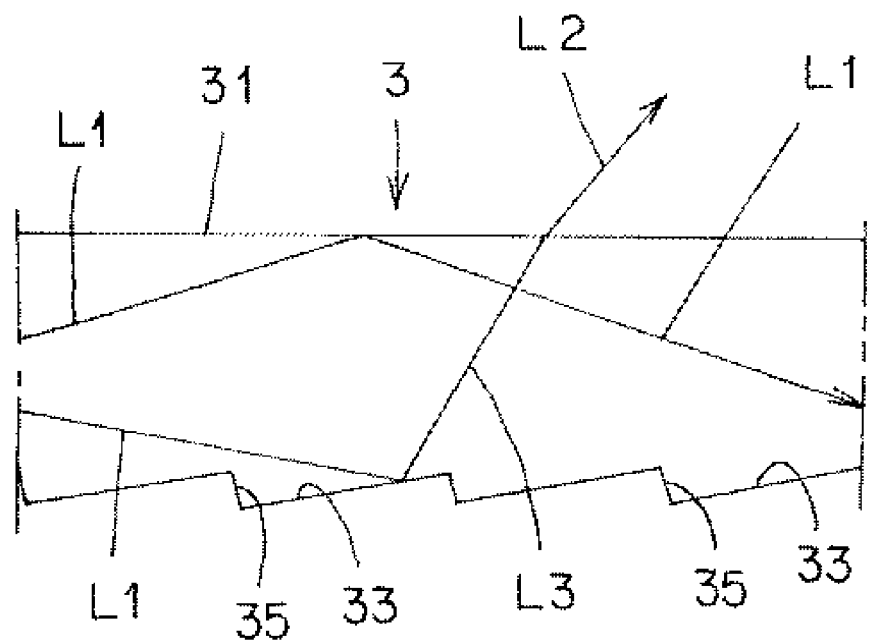
FIG. 6 is a cross sectional view (sectional view taken along line VI-VI in FIG. 5) showing a part of an incident surface of a light guide member.
Figure 7:
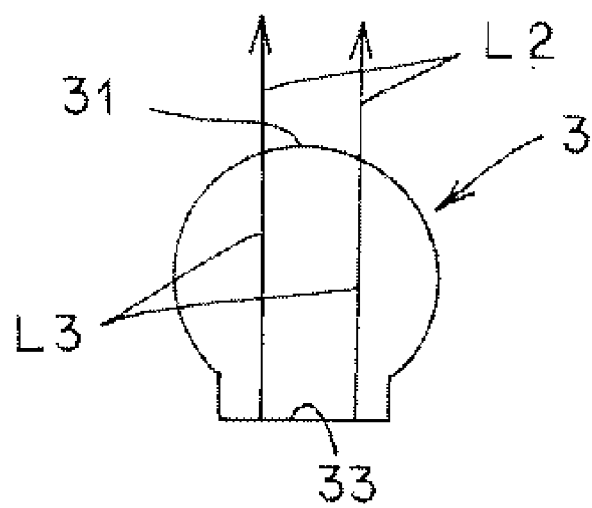
FIG. 7 is a longitudinal sectional view (sectional view taken along VII-VII in FIG. 5) showing a part of an incident surface of a light guide member.

The semiconductor-type light source 2 is, as shown in FIG. 1 and FIG. 5, a self-emitting semiconductor-type light source such as an LED, OEL and OLED (organic EL). The semiconductor-type light source 2 comprises a light emitting part 20, and a substrate 21. The semiconductor-type light source 2 is disposed in the lamp chamber at the locations of the outside O of a vehicle, and on the rear side and lower side. The semiconductor-type light source 2 is attached to the lamp housing directly or via another member (not shown).

(Description of Light Guide Member 3)

The light guide member 3 is a member for guiding light from the semiconductor light source 2 to the incident surface 30 and the exit surface 31 by using inside total reflection (internal reflection). The light guide member 3 is, in this example, made of a translucent resin material such as an acrylic resin or PC (polycarbonate), and PMMA (polymethyl methacrylate, methacrylate resin). The light guide member 3 forms a circular cylindrical shape, that is a round bar shape, having an equal or substantially equal cross-section (vertical or substantially vertical cross-section relative to the light guide direction of the light guide member 3) from one end to the other end. The light guide member 3 has a diameter of about 6 to 8 mm in this example.

The light guide direction, that is the direction for guiding light, of the light guide member 3 is the direction of the not-shown center line (central axis) of the light guide member 3 forming a cylindrical shape having a circular cross section.

The light guide member 3 is, as shown in FIG. 1, along the design surface in the front of a vehicle and the design surface of the lamp lens 6. In other words, the light guide member 3 forms a substantially horizontal line shape in the front view. The light guide member 3 is arranged over the outside O to the inside I of a vehicle along the lower side in the lamp chamber. The light guide member 3 is attached to the lamp housing directly or via another member (not shown). For example, an attachment piece (not shown) provided integrally with the light guide member 3 is attached to the lamp housing directly or via another member (not shown).

The light guide member 3 guides light by using total reflection inside. The light guide member 3 comprises the incident surface 30 in one end face, the exit surface 31, other end face 32, and a reflection surface 33. The light guide member is, as shown in FIGS. 2 and 3, arranged at a position blocking a part of the radiated light L4 from the second lamp unit 12.

(Description of Incident Surface 30)

The incident surface 30 is provided on one end surface of the light guide member 3. The incident surface 30 is opposed to the light emitting part 20 of the semiconductor-type light source 2. The center of the incident surface 30 coincides or substantially coincides with the center of the light emitting part 20. The incident surface 30 comprises a plane, a curved surface, or a combination of plane and curved surface. The incident surface 30 enters light emitted from the light emitting part 20 into the light guide member 3. The incident surface 30 and the semiconductor-type light source 2 are, as shown in FIG. 1, arranged outside O of a vehicle and on the lower side.

(Description of Exit Surface 31)

The exit surface 31 is provided over one side of the front of the light guide member 3 (that is, the front) to one side of the upper side (i.e. upper surface) and one side of the lower side (i.e. lower surface). The exit surface 31 is opposite to the lamp lens 6. The exit surface 31 comprises an arcuate surface having a substantially arc-shaped cross section (vertical or substantially vertical to the light guide direction of the light guide member 3). The exit surface 31 emits to the outside from the light guide member 3, the incident light L1 entered from the incident surface 30 to the light guide member 3 as emitting light L2.

Figure 8:
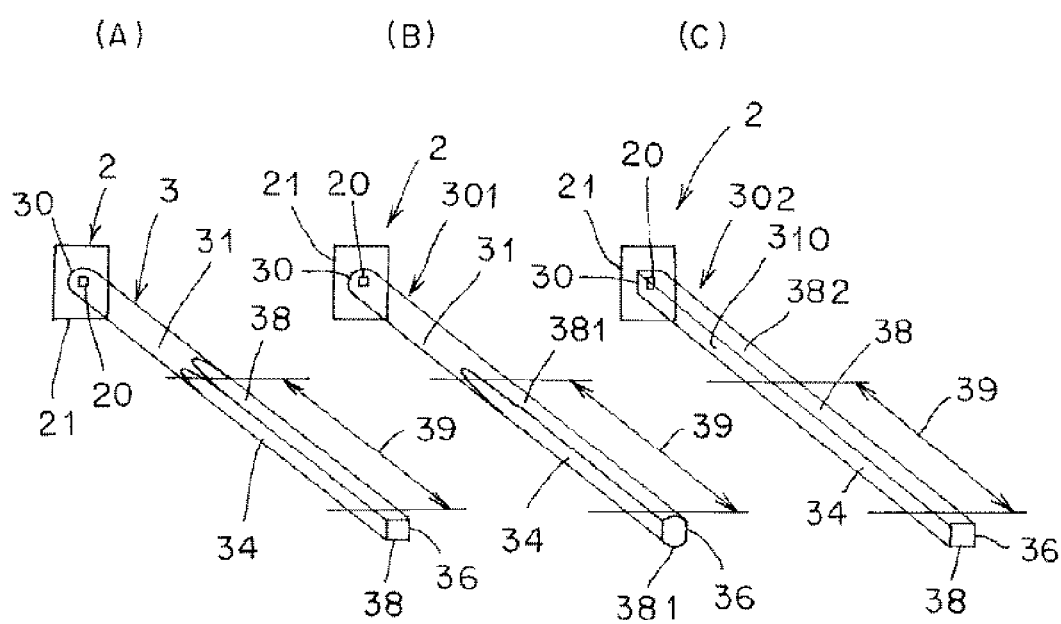
FIG. 8 is a perspective view showing a light guide member of the embodiment, and two modifications of a light guide member.

As shown in FIG. 2, FIG. 3, and FIG. 8 (A), a plane exit surface 34 for emitting the radiated light L4 is provided in a part 39 (hereinafter referred to as a blocking part 39) of the arcuate exit surface 31 for blocking at least a part of the radiated light L4.

(Description of Reflection Surface 33)

The reflection surface 33 is provided on one side after the light guide member 3 (i.e. backside). The reflection surface 33 comprises a plane having a linear cross section (cross section vertical or substantially vertical to the light guide direction of the light guide member 3). The reflection surface 33 reflects a part of the incident light L1 from the incident surface 30 to the light guide member 3 to the exit surface 31 as a reflected light L3.

The reflection surface 33 is, as shown in FIGS. 3, 4, 6 and 7, provided continuously in a large number in the light guide direction from one end face of the light guide member 3 to the other end face 32. The reflection surface 33 is one end portion of the light guide member 3 of the incident surface 30 side, and is not provided in a part hidden by the inner panel 7. The width of the reflection surface 33 is about 2 mm in this example.

Between the reflection surfaces 33, a plane (or curved) step surface 35 is provided. In other words, the reflection surface 33 is continuously provided in a large number via the step surface 35. One reflection surface 33 and one step surface 35 constitute a prism. The reflection surface 33 is inclined from the outside O to the inside I of a vehicle over the rear side to the front side.

As shown in FIGS. 2 and 3, in at least the blocking part 39 of the prism, a plane incident surface 36 for entering the radiated light L4 is provided. The plane incident surface 36 is provided between the reflection surface 33 of the prism and the step surface 35 of the prism.

Figure 4:
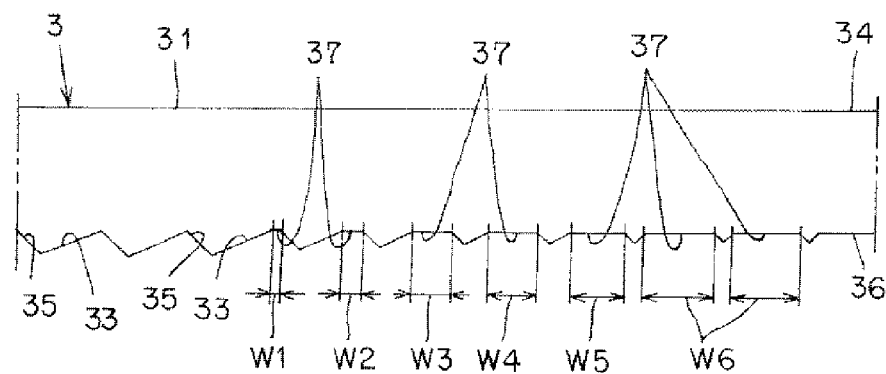
FIG. 4 is a sectional view (sectional view corresponding to FIG. 3) showing a prism comprising a reflection surface and a step surface of a light guide member, and a plane part.

As shown in FIG. 4, between the reflection surface 33 and the step surface 35 of the prism in the part from the incident surface 30 to the blocking part 39, a plane part 37 is provided. The widths W1, W2, W3, W4, W5, and W6 of the plane part 37 increase as separating from the incident surface 30. As the width of the plane part 37 increases, the widths and heights of the reflection surface 33 and the step surface 35 decreases.

A side surface of both the plane exit surface 34 and the plane incident surface 36 of the blocking part 39 comprises a plane both side surface 38 as shown in FIG. 8 (A).

(Description of Second Lamp Unit 12)

The second lamp unit 12 comprises a semiconductor-type light source 8 as a light source, and a lens member 9. In the second lamp unit 12, two units are arranged inside I of a vehicle and at locations of rear and lower sides in the lamp chamber.

(Description of Semiconductor-type Light Source 8)

The semiconductor-type light source 8 uses a semiconductor-type light source that is substantially the same as the semiconductor-type light source 2 of the first lamp unit 1. The semiconductor-type light source 8 is, as shown in FIGS. 2 and 3, a self-emitting semiconductor-type light source, for example, an LED, OEL, or OLED (organic EL). The semiconductor-type light source 8 comprises a light-emitting part 80, and a substrate 81. The semiconductor-type light source 8 is attached to the lamp housing directly or via another member (not shown).

(Description of Lens Member 9)

The lens member 9, as shown in FIG. 1, forms a substantially circular shape around or substantially around the semiconductor light source 8 in the front view. The lens member 9, as shown in FIGS. 2 and 3, forms a substantially cup shape in the longitudinal and horizontal sections passing the semiconductor light source 8.

The lens member 9 is made of substantially the same translucent resin material as the light guide member 3, such as, a PC (polycarbonate) and PMMA (Polymethyl methacrylate, methacrylic resin) in this example. The lens member 9 is attached to the lamp housing via a mounting member (not shown). In other words, the semiconductor-type light source 8 and the lens member 9 are attached to the lamp housing in the state where the relative mounting position is kept.

The lens member 9 has an incident surface 90, a first exit surface 91, a second exit surface 92, a third exit surface 93, a fourth exit surface 94, a reflection surface 95, a first step surface 96, a second step surface 97, and a third step surface 98.

The incident surface 90 is a surface to enter the light emitted from the light emitting part 80 of the semiconductor-type light source 8 into the lens member 9 as an incident light.

The first exit surface 91, second exit surface 92, third exit surface 93, and fourth exit surface 94 are surfaces to emit the incident light to the outside as a radiated light L4. The first exit surface 91 forms a substantially circular shape around or almost around the semiconductor-type light source 8 in the front view. The second exit surface 92, third exit surface 93, and fourth exit surface 94 form a substantially annular shape around or almost around the semiconductor-type light source 8 in the front view.

The reflection surface 95 is a surface to reflect a part of the incident light as a reflected light parallel to the second exit surface 92, third exit surface 93, and fourth exit surface 94.

The first step surface 96 consists of an inclined surface provided between the first exit surface 91 and the second exit surface 92, and a vertical surface parallel to the radiated light L4. The second step surface 97 consists of a vertical surface parallel to the radiated light L4 provided between the second exit surface 92 and the third exit surface 93. The third step surface 98 consists of a vertical surface parallel to the radiated light L4 provided between the third exit surface 93 and the fourth exit surface 94.

The first exit surface 91 emits a relatively strong direct light from the semiconductor-type light source 8 as a radiated light L4. In front of the first exit surface 91, the blocking part 39 of the light guide member 3 is arranged so as to block the light. The second exit surface 92, third exit surface, and fourth exit surface 94 emit a relatively weak light from the semiconductor-type light source 8, that is a reflected light from the reflection surface 95, as a radiated light L4.

(Description of Low Beam Headlamp 4 and High Beam Headlamp 5)

The low beam headlamp 4 emits a low beam light distribution pattern from the lamp lens 6 to the front of a vehicle. The high beam headlamp 5 emits a high beam light distribution pattern from the lamp lens 6 to the front of a vehicle.

(Description of Lamp Lens 6)

The design surface of the lamp lens 6 is inclined along the design surface in the front of a vehicle, from the rear to the front of a vehicle, and from the upper side to the lower side of a vehicle, and toward the inside I from the outside O of a vehicle.

(Description of Inner Panel 7)

The inner panel 7 is attached to the lamp housing directly or via another member (not shown). The inner panel 7 hides a part of the semiconductor-type light source 2 and light guide member 3, that is an end portion of the incident surface 30, viewed from the lamp lens 6.

The inner panel 7 is provided with a through hole 70 to insert an end portion of the incident surface 30 of the light guide member 3. A housing groove 71 is provided in an area where the light guide member 3 and the second lamp unit 12 of the inner panel 7 are located. The light guide member 3 and the second lamp unit 12 are housed in the housing groove 71. The housing groove 71 is opened on a side opposite to the lamp lens 6, and closed by a vertical wall on three sides. The vertical wall of the housing groove 71 functions as a reflection surface. The reflection surface is made of the same material as the inner panel 7. By coating or depositing metal such as aluminum and silver on the vertical wall of the housing groove 71, a reflection surface with highly reflection efficiency may be obtained.

(Description of Functions of the Embodiment)

The vehicle lighting device 1 according to the embodiment is configured as described above. The functions of the device will be described below.

Turn on the light emitting part 20 of the semiconductor-type light source 2 of the first lamp unit 11. At this time, the light emitting part 80 of the semiconductor-type light source 8 of the second lamp unit 12 is in the off state. Then, light emitted from the light emitting part 20 enters the light guide member 3 from the incident surface 30 of the light guide member 3. The incident light L1 entered the light guide member 3 is guided in the light guide member 3 from the incident surface 30 of one end to the other end face 32 while repeating total reflection.

A part of the incident light L1 guided from one end to the other in the light guide member 3 is reflected by the reflection surface 33 as a reflected light L3, and transmitted to the front of the arcuate exit surface 31 and the plane exit surface 34 (hereinafter, referred to as the exit surfaces 31 and 34). The reflected light L3 is emitted from the front of the exit surfaces 31 and 34 to the outside, that is the front of a vehicle, as an emitted light L2 through the lamp lens 6. Thus, the linear front (a substantially horizontal line shape in the front view in FIG. 1) of the light guide member 3 emits light. The emitted light L2 is emitted to the front of a vehicle as a clearance lamp light distribution pattern. The clearance lamp light distribution pattern illuminates a range of about 80° of the outside O, about 40° of the inside I, and about 15° of up and down of a vehicle.

Turn on the light emitting part 80 of the semiconductor-type light source 8 of the second lamp unit 12. At this time, the light emitting part 20 of the semiconductor-type light source 2 of the first lamp unit 11 is in the off state. Then, light emitted from the light emitting part 80 enters a lens member 9 from an incident surface 90 of the light lens member 9. A part of the incident light entered the lens member 9 is emitted from a first exit surface 91 to the outside, that is the front of a vehicle, as a parallel radiated light L4.

A part of the incident light entered the lens member 9 is reflected by a reflection surface 95 as a reflected light parallel to a second exit surface 92, a third exit surface 93, and a fourth exit surface 94. The parallel reflected light is emitted to the outside, that is the front of a vehicle, as a parallel radiated light L4 from the second exit surface 92, the third exit surface 93, and the fourth exit surface 94.

The parallel radiated light L4 emitted from the first exit surface 91, second exit surface 92, third exit surface 93, and fourth exit surface 94 of the lens member 9 is emitted slightly above the front of a vehicle as a daytime running lamp light distribution pattern.

Here, as shown in FIGS. 2 and 3, a part of the radiated light L4 is blocked by the light guide member 3 of the first lamp unit 11. A part of the radiated light L4 enters the light guide member 3 from the plane incident surface 36 of the blocking light guide member 3, exits from the plane exit surface 34 as a parallel radiated light L4, and forms a daytime running lamp light distribution pattern. The light, that is a part of the radiated light L4 entered the light guide member 3 from the reflection surface 33 and step surface 35 of the light guide member 3, is diffused, and emitted from the plane exit surface 34 as a diffused light (not shown).

(Description of Effects of the Embodiment)

The vehicle lighting device 1 according to the embodiment has the configuration and functions as described above. The effects of the embodiment will be described below.

In the vehicle lighting device 1 according to the embodiment, the plane exit surface 34 is provided in the part 39 for blocking a part of the radiated light L4 from the second lamp unit 12, of the arcuate exit surface 31 of the light guide member 3 of the first lamp unit 11, and the plane incident surface 36 is provided between the prisms of the part 39 for blocking a part of the radiated light L4 from the second lamp unit 12, of the prisms comprising the reflection surface 33 and the step surface 35 of the light guide member 3 of the first lamp unit 11. Thus, even when the light guide member 3 of the first lamp unit 11 is arranged at the position blocking a part of the radiated light L4 from the second lamp unit 12, the radiated light L4 from the second lamp unit 12 passes through the plane incident surface 36 of the reflection surface 33 and the plane exit surface 34 of the exit surface 31 of the light guide member 3, and the optical loss of the radiated light L4 can be minimized.

In the vehicle lighting device 1 according to the embodiment, the plane part 37 is provided between the reflection surface 33 and the step surface 35 of the prism between the incident surface 30 of the light guide member 3 and the part 39 for blocking a part of the radiated light L4 from the second lamp unit 12. The widths W1 to W6 of the plane part 37 increase as separating from the incident surface 30. Thus, the light intensity of the emitted light L2 from the exit surface 31 of the light guide member 3 is adjusted to be gradually decreased between the incident surface 30 and the part 39 blocking a part of the radiated light L4. Therefore, a brightness difference between the bright incident surface 30 and the dark part 39 blocking a part of the radiated light L4 can be gradually changed, and the appearance of the light guide member 3 in the light emitting state is not reduced.

In the vehicle lighting device 1 according to the embodiment, the vertical wall of the housing groove 71 of the inner panel 7 functions as a reflection surface. Thus, it is possible to effectively use the light from the semiconductor-type light source 2 by reflecting the light (for example, leakage light) from the light guide member 3 housed in the housing groove 71 by the reflection surface.

In the vehicle lighting device 1 according to the embodiment, the light guide member 3 of the first lamp unit 11 is arranged so as to block the front of the first exit surface 91 of the lens member 9 of the second lamp unit 12. Thus, the relatively strong radiated light L4 emitted from the first exit surface 91 passes through the light guide member 3, suppressing the feeling of lighting the semiconductor-type light source 8 of the second lamp unit 12. This is preferable for the appearance.

(Description of Modifications of Light Guide Members 301 and 302) p FIG. 8 (B) shows a light guide member 301 of a first modification. The light guide member 301 of the first modification comprises both side surfaces 381 having an arcuate surface between the plane exit surface 34 and the plane incident surface 36 of the blocking part 39.

FIG. 8 (C) shows a light guide member 302 of a second modification. The light guide member 302 of the second modification comprises an exit surface 310 having a plane exit surface on the incident surface side, and a plane both side surfaces 382 having a plane surface between the plane exit surface 310 on the incident surface side and a prism comprising a a reflection surface and a step surface.

(Description of Examples Other than the Embodiment)

The above embodiments describe a clearance lamp and a daytime running lamp in a front combination lamp. The present invention is applicable also to a vehicle lighting device other than a clearance lamp and a daytime running lamp in a front combination lamp, for example, a clearance lamp in a front combination lamp, an a turn signal lamp, a clearance lamp, a tail lamp, and a stop lamp in a rear combination lamp.

In the above embodiments, the light guide member 3 forms a cylindrical shape having a circular cross-section. In the present invention, a light guide member may be a columnar shape having a triangular cross-section, a square cross-section, or a polygonal cross-section.

Further, in the above embodiments, the diameter of the light guide member 3 is about 6 to 8 mm, the width of the reflection surface is about 2 mm. In the present invention, the diameter of a light guide member and the width of a reflection surface are not particularly limited.

Furthermore, in the above embodiments, the light guide member 3 forms a substantially horizontal line shape in the front view. In the present invention, the shape of a light guide member is not particularly limited. For example, the shape of the light guide member may be a vertical line shape, an L-shape, and the likes.

Still furthermore, in the above embodiments, the lamp lens 6 comprises a plain lens. In the present invention, the lamp lens may be a diffusion-based prism such as a fisheye prism.

In addition, in the above embodiments, the semiconductor-type light source 2 is arranged on the incident surface 30 side in one end face of the light guide member 3. In the present invention, the semiconductor-type light source 2 may be arranged in the other end face 32 of the light guide member 3.

Further, in the above embodiments, the plane exit surface 34 is provided in the blocking part 39 of the exit surface 31 of the light guide member 3 of the first lamp unit 11, and the plane incident surface 36 is provided in the blocking part 39 of the reflection surface 33 of the light guide member 3 of the first lamp unit 11. In the present invention, any one of the plane exit surface 34 and the plane incident surface 36 may be provided.

Furthermore, in the above embodiments, the plane part 37 having the widths W1 to W6 increased as separating from the incident surface 30 is provided between the reflection surface 33 of the prism and step surface 35 of the prism formed in the part from the incident surface 30 of the light guide member 3 to the blocking part 39. In the present invention, the plane part 37 may not be provided.

What is claimed is:

1. A vehicle lighting device comprising:
   a lamp housing and a lamp lens that partition a lamp chamber; and
   a first lamp unit and a second lamp unit that are arranged in the lamp chamber,
   wherein the first lamp unit comprises a light source, and a light guide member, and
   the light guide member forms a rod shape for guiding light by utilizing total reflection inside, comprises
   an incident surface to incident light from the light source,
   an exit surface to emit incident light, and
   a reflection surface to reflect incident light to the exit surface,
   the light guide member is located in front of a light radiating direction of the second lamp unit, and
   a plane is provided at a position for blocking a part of radiated light from the second lamp unit.

2. The vehicle lighting device according to claim 1, wherein
   the plane is provided in at least one of a part for blocking a part of the radiated light of the exit surface of the light guide member, and a part for blocking a part of the radiated light of the reflection surface of the light guide member.

3. The vehicle lighting device according to claim 1, wherein
   the exit surface comprises an arcuate surface having a substantially arcuate cross section vertical or substantially vertical to a light guide direction of the light guide member,
   the the reflection surface comprises a plane having a substantially linear cross section vertical or substantially vertical to a light guide direction of the light guide member,
   a step surface is provided between the reflection surface and the reflection surface,
   a prism is comprised of the reflection surface and the step surface, and
   a plane exit surface for emitting the radiated light is provided in at least a part of the arcuate exit surface for blocking a part of the radiated light, or a plane incident surface to incident the radiated light is provided in at least a part of the prism for blocking a part of the radiated light.

4. The vehicle lighting device according to claim 3, wherein
   the plane incident surface is provided at least between the part of the prism for blocking a part of the radiated light and the prism.

5. The vehicle lighting device according to claim 3, wherein
   a plane part is provided between the prism from a part of the incident surface to a part for blocking a part of the radiated light and the prism, and
   the plane increases as separating from the incident surface.

* * * * *